United States Patent Office 3,459,734
Patented Aug. 5, 1969

3,459,734
N-SUBSTITUTED ANALOGS OF LINCOMYCIN
Barney J. Magerlein, Portage, Mich., assignor to The Upjohn Company, Kalamazoo, Mich., a corporation of Delaware
No Drawing. Continuation-in-part of application Ser. No. 615,364, Feb. 13, 1967. This application Mar. 29, 1968, Ser. No. 717,411
Int. Cl. C07c *95/04, 149/24;* C08g *22/16*
U.S. Cl. 260—210
17 Claims

ABSTRACT OF THE DISCLOSURE

N-alkyl derivatives of methyl 6-amino-6,8-dideoxy-1-thio-D-erythro-α-D-galacto-octopyranoside, which has been given the trivial name methyl α-thiolincosaminide (abbreviated to MTL), and of ethyl 6-amino-6,8-dideoxy-1-thio-D-erythro-α-D-galacto-octopyranoside (abbreviated to ETL), intermediates, and processes for producing them exemplified as follows: (1) condensation of MTL with an aromatic aldehyde to form N-arylmethylene-MTL; (2) reduction of N-arylmethylene-MTL to give N-arylmethyl-MTL; (3) treatment of N-arylmethyl-MTL with a lower aliphatic aldehyde to give an oxazolidine compound; and, (4) hydrogenolysis of the oxazolidine compound to give N-loweralkyl-MTL and N,N-diloweralkyl-MTL. N,N-diloweralkyl-MTL also is obtained by alkylating MTL or N-loweralkyl-MTL. The above compounds are useful for the resolution of racemic acids, as intermediates to form urethanes and ureas, and as mothproofing agents.

CROSS REFERENCE TO RELATED APPLICATION

This application is a continuation-in-part of copending application Ser. No. 615,364, filed in the U.S. Patent Office on Feb. 13, 1967 and now abandoned.

BRIEF SUMMARY OF THE INVENTION

Novel N-substituted analogs of MTL and ETL are obtained by a four-step chemical process. Using MTL as exemplary of the reactions which ETL also undergoes, the four-step process proceeds as follows: (1) MTL (I) is condensed wih an aromatic aldehyde to form N-arylmethylene-MTL (II); (2) N-arylmethylene-MTL (II) is reduced using a platinum catalyst to give N-arylmethyl-MTL (III); (3) N-arylmethyl-MTL (III) is treated with a lower aliphatic aldehyde to give an oxazolidine compound (IV) or (IVa); and (4) the oxazolidine compound (IV) or (IVa) is hydrogenolyzed to give N-loweralkyl-MTL (V) and N,N-diloweralkyl-MTL (VI).

The above reactions can be illustratively represented by the following sequence of formulae:

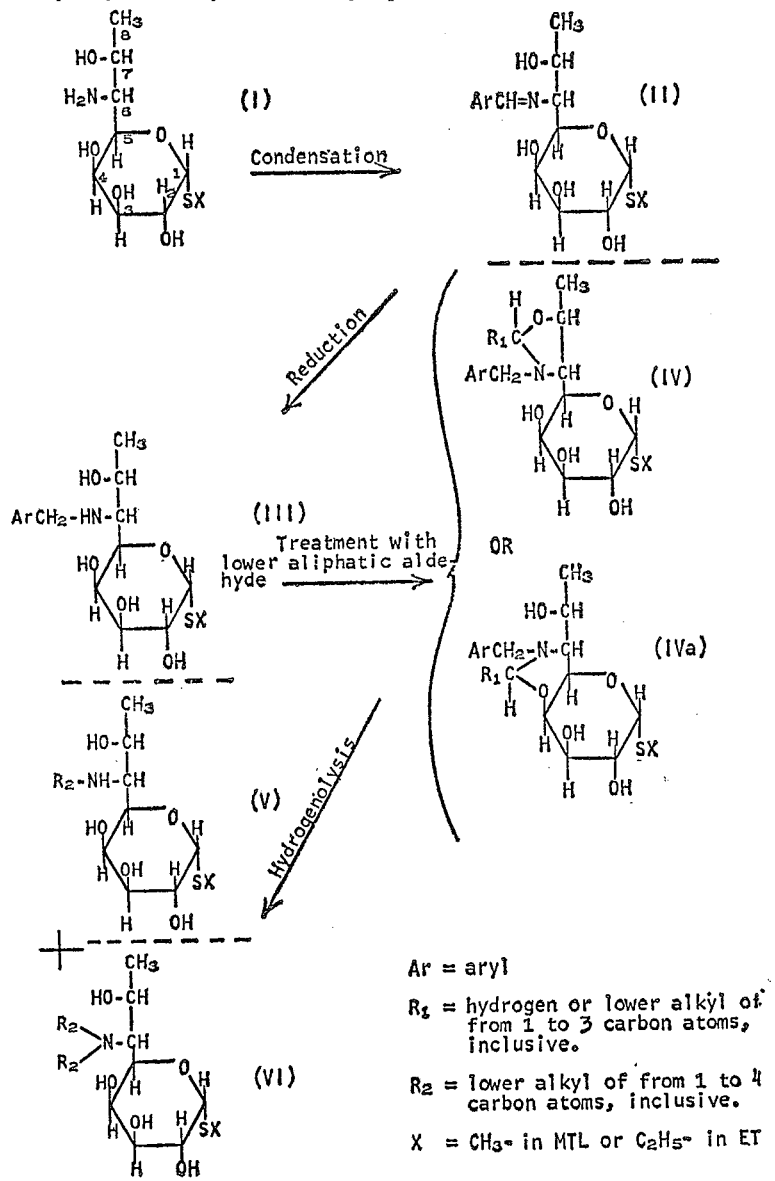

Ar = aryl $R_1$ = hydrogen or lower alkyl of from 1 to 3 carbon atoms, inclusive.

$R_2$ = lower alkyl of from 1 to 4 carbon atoms, inclusive.

X = $CH_3$- in MTL or $C_2H_5$- in ET

N,N-diloweralkyl-MTL (VI) also can be formed by alkylating N-loweralkyl-MTL (V) with one mole of alkylating agent. Alternatively, N,N-diloweralkyl-MTL (VI) can be formed by alkylating MTL (I) with at least two moles of alkylating agent. Unexpectedly, direct alkylation of MTL (I) does not produce N-loweralkyl-MTL (V). Condensation with an aromatic aldehyde, as shown above, is first necessary. ETL derivatives react in the same manner as MTL derivatives in the above reactions to give N,N-diloweralkyl-ETL (VI). These processes for the production of N,N-diloweralkyl-MTL (VI) or ETL can be illustratively represented by the following sequence of formulae:

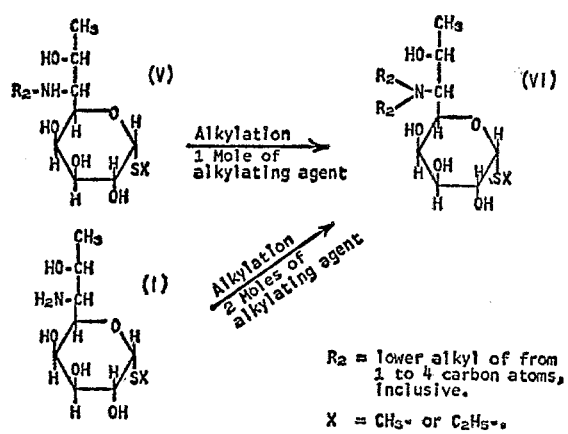

N-loweralkyl-MTL (V) and N,N-diloweralkyl-MTL (VI) can be acylated with an acylating reagent selected from acid halides and acid anhydrides of hydrocarbon carboxylic acids containing from 2 to 18 carbon atoms, inclusive, to give N-loweralkyl-MTL pentaacylate (VII) and N,N-diloweralkyl-MTL (VIII) tetraacylate, respectively. In a like manner, N-loweralkyl-ETL and N,N-diloweralkyl-ETL can be used to produce N-loweralkyl-ETL pentaacylate and N,N-diloweralkyl-ETL tetraacylate, respectively.

The above acylations can be illustratively represented by the following formulae:

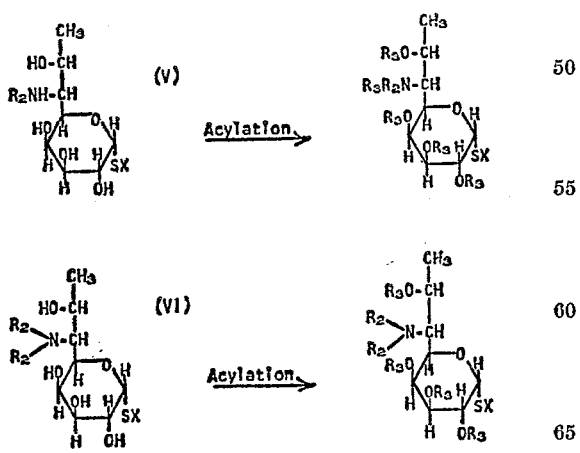

$R_2$=lower alkyl of from 1 to 4 carbon atoms, inclusive.
$R_3$=a carboxylic acid acyl radical of from 2 to 18 carbon atoms.
X=$CH_3$— or $C_2H_5$—.

The condensation of MTL (I) with an aromatic aldehyde to form N-arylmethylene-MTL (II) can be conducted conveniently at room temperature. The aromatic aldehyde is added to a suspension of MTL (I) in water which, advantageously, has been made basic by an alkaline solution, for example, sodium hydroxide. The solid material dissolves rapidly and crystals of N-arylmethylene-MTL (II) are formed in a few minutes. The crystals can be recovered by filtering the solution, washing the residue with water, and drying the remaining crystals.

A variety of aromatic aldehydes can be used in the process of the invention, for example; furfural, benzaldehyde, m-tolualdehyde, p-tolualdehyde, m-chlorobenzaldehyde, p-bromobenzaldehyde, m-methoxybenzaldehyde, 3,4-dimethoxybenzaldehyde (veratric aldehyde), 3,4,5-trimethoxybenzaldehyde, o-nitrobenzaldehyde, phthaldehyde, p-nitrobenzaldehyde, p-bromobenzaldehyde, 2,4-dichlorobenzaldehyde, protocatechualdehyde, 5-methylfurfural, salicylaldehyde, o-tolualdehyde, o-chlorobenzaldehyde, m-bromobenzaldehyde, p-methoxybenzaldehyde, o-methoxybenzaldehyde, p-hydroxybenzaldehyde, piperonal, p-chlorobenzaldehyde, m-nitrobenzaldehyde, β-naphthaldehyde, o-bromobenzaldehyde, vanillin, terephthaldehyde, cinnamaldehyde.

The reduction of N-arylmethylene-MTL (II) to N-acrylmethyl1MTL (III) is accomplished by subjecting N-arylmethylene-MTL (II) in a methanol solution containing platinum oxide catalyst moistened with ethanol, to about 20 pounds per square inch of hydrogen pressure for about 4 to 5 hours. The catalyst can be removed by filtration and the solvent distilled under vacuum. The resulting crystalline residue consisting of N-arylmethyl-MTL (III) can be dissolved in methanol and diluted with ethyl acetate. The crystals of N-arylmethyl-MTL (III) are collected by filtration and dried.

N-arylmethyl-MTL (III) is converted to an oxazolidine compound (VI) or (IVa) by treating the former compound with at least 1 mole of a lower alkyl aliphatic aldehyde containing from one to four carbon atoms. For example, by treating N-benzyl-MTL (III) with 1 mole of Formalin in methanol, there is obtained the corresponding oxazolidine compound (IV) or (IVa). The reaction can be conducted, advantageously, at room temperature for about 30 minutes to one hour. Though the best analytical data indicates that the alkylidene bridges the 6,7-position of the molecule, this does not negate the possibility that the alkylidene group bridges the 6,4-position of the molecule instead. Thus, the formula for the oxazolidine compound is shown as (IV) or (IVa). A single structural formula representing compounds shown in Formulae IV and IVa is as follows:

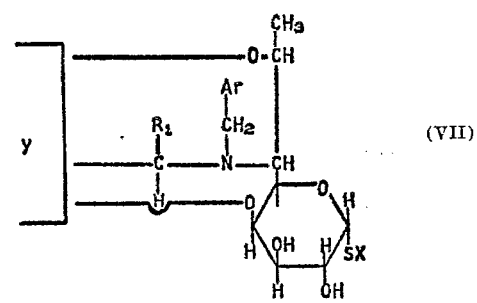

wherein Ar is aryl; $R_1$ is hydrogen or lower alkyl of from 1 to 3 carbon atoms, inclusive; X is $CH_3$— or $C_2H_5$—; y is hydrogen attached to an oxygen, and the remaining free bonds are connected.

Hydrogenolysis of the oxazolidine compound (IV) or (IVa) affords N-loweralkyl-MTL (V) and N,N-diloweralkyl-MTL (VI). The hydrogenolysis can be conducted, conveniently, at room temperature using palladium-carbon as a catalyst.

Acylation of N-loweralkyl-MTL and N,N-diloweralkyl-MTL is accomplished by reacting these compounds with the halide or anhydride of a carboxylic acid of not more than 18 carbon atoms, or a halo-, nitro-, hydroxy-, amino-, cyano-, and thiocyano-, substituted carboxylic acid containing from 2 to 18 carbon atoms, inclusive, in the presence of an acid-binding agent, for example, a tertiary amine. Suitable acid-binding agents include heterocyclic amines such as pyridine, quinoline, and isoquinoline; trialkylamines such as trimethylamine, triethylamine, triisopropylamine, and the like; and N-N-dialkylanilines such as dimethylaniline, diethylaniline, and the like; and N-alkylpiperidines such as N-ethylpiperidine, and N-methylpiperidine, and the like. The preferred base is pyridine. The reaction is conducted by treating a suspension of N-loweralkyl-MTL or N,N-diloweralkyl-MTL, depending on the end product desired, in the tertiary amine with the acid halide or anhydride and heating the resulting mixture, if desired, for a short period at a temperature not greater than about 100° C. to complete the reaction. The resulting acylated products can be isolated by conventional procedures.

The term "hydrocarbon carboxylic acid acyl radical of from 2 to 18 carbon atoms" whenever used in the specification or claims is intended to mean an acyl corresponding to a hydrocarbon carboxylic acid of from 2 to 18 carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octylnoic acids, and the like; (b) a saturated or unsaturated alicyclic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated substituted alicyclic aliphatic carboxylic acid, for example, cyclopentaneacetic acid, cyclopentanepropionic acid, cyclopenteneacetic acid, cyclohexanebutyric acid, methylcyclohexaneactic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropionic acid, and naphthylacetic acid, and the like.

The term "halo-, nitro-, hydroxy-, amino-, cyano-, and thiocyano-substituted hydrocarbon carboxylic acid acyl of from two to eighteen carbon atoms, inclusive" is intended to mean hydrocarbon carboxylic acid acyl as hereinbefore defined which are substituted by one or more halogen atoms, nitro, hydroxy, amino, cyano, or thiocyano groups. Examples of substituted hydrocarbon carboxylic acids are mono-, di-, and trichloracetic acid; α- and β-chloropropionic acid; α- and γ-bromobutyric acid; α- and δ-iodovaleric acid; mevalonic acid; 2- and 4-chlorocyclohexanecarboxylic acid; shikimic acid; 2-nitro-1-methyl - cyclobutanecarboxylic acid; 1,2,3,4,5,6 - hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4,5-dibromo-2-methylcyclohexanecarboxylic acid; 5,6-dibromo-2-methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1 - bromo - 3,5 - dimethylcyclohexanecarboxylic acid; homogentisic acid, o-, m-, and p-chlorobenzoic acid; anisic acid; salicylic acid; p-hydroxybenzoic acid; β-resorcylic acid; gallic acid; veratric acid; trimethoxybenzoic acid; trimethoxycinnamic acid; 4,4′-dichlorobenzilic acid; o-, m- and p-nitrobenzoic acid; cyanoacetic acid; 3,4- and 3,5-dinitrobenzoic acid; 2,4,6-trinitrobenzoic acid; thiocyanoacetic acid; cyanopropionic acid; and the like.

Compounds (II) to (VIII), inclusive, exist in the non-protonated (free base) form or the protonated (salt) form depending upon the pH of the environment. These compounds form stable protonates (acid addition salts) by neutralization of the free base with an acid or by metathesis between the protonated form of the compound and the anion of an acid. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3 - methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and like acids. These acid addition salts are useful in upgrading the free base.

The novel compounds of the invention, N-arylmethylene-MTL (II), N-arylmethyl-MTL (III), oxazolidine compounds (IV) or (IVa), N-loweralkyl-MTL (V), and N,N-diloweralkyl-MTL (VI), and the acid addition salts of these compounds, are useful for the resolution of racemic acids. For example, N-loweralkyl-MTL (V), reacts with racemic acids to form diastereoisomeric acid addition salts which separate by fractional crystallization into diastereoisomers from which the optically active acids are regenerated. The above novel compounds of the invention are also useful as intermediates. They react with isocyanates to form urethanes and ureas and can be used to modify polyurethane resins. For example, the novel compounds of this invention react with an excess of toluene diisocyanate to form a prepolymer which then reacts with the polyol ethers and polyol esters commonly used to form polyurethanes. The compounds of this invention also react with ethylene oxide, propylene oxide, and like alkylene oxides to form polyoxyalkylene compounds which, in turn, react with toluene diisocyanate to form a polyurethane. The novel compounds of this invention are particularly useful for producing rigid polyurethane foams. Also, they condense with formaldehyde according to U.S. Patent 2,425,320 and 2,606,155, especially when the thiocyanic acid addition salt is employed, to form polymers which are useful as pickling inhibitors. Their fluosilicic acid addition salts are useful as mothproofing in accordance with U.S. Patents 1,915,334 and 2,075,359. The novel acylates N-loweralkyl-MTL pentaacylate (VII) and N,N-diloweralkyl-MTL tetraacylate (VIII) can be used to upgrade N-loweralkyl-MTL (V) and N,N-diloweralkyl-MTL (VI). Thus, by acylating compounds (V) and (VI), purifying the acylate, thereby separating it from non-acylatable and other impurities, and deacylating it to compound (V) and compound (VI), these compounds are upgraded. The deacylation is readily accomplished by reacting the acylates with dilute aqueous base at 15–80° C., or with ammonia in methanol at 15–40° C.

The ETL derivatives disclosed herein can be used for the same purposes as disclosed above for the MTL derivatives.

The following examples are illustrative of the process and products of the present invention but are not to be construed as limiting. All percentages are by weight and all solvent mixture proportions are by volume unless otherwise noted.

PREPARATION OF METHYL
α-THIOLINCOSAMINIDE

Methyl α-thiolincosaminide can be prepared in accordance with the procedures set out in U.S. Patent 3,179,565.

PREPARATION OF ETHYL α-THIOLINCOSAMINIDE

Ethyl α-thiolincosaminide can be prepared in accordance with the procedures set out in the publication by A. D. Argoudelis and D. J. Mason, Biochemistry, 4, 704–709 (1965) at page 705. This procedure also refers to a publication by Argoudelis et al. in Biochemistry, 4, 698–703 (1965) for the operating conditions of the hydrazinolysis. The microorganism disclosed in U.S. Patent 3,086,912 can be used in the fermentation procedure disclosed in Biochemistry, 4, pages 704–705.

EXAMPLE 1

Methyl N-arylmethylene-α-thiolincosaminide (II) and ethyl N-arylmethylene-α-thiolincosaminide (II)

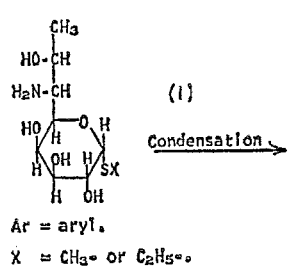

(A) Methyl N-benzylidene-α-thiolincosaminide.—With vigorous stirring, 24.7 ml. of benzaldehyde was added to a suspension of 50.0 g. of methyl α-thiolincosaminide in 990 ml. of water containing 99 drops of 5% sodium hydroxide solution. The solid rapidly dissolved and crystals of N-benzylidene-methyl α-thiolincosaminide formed in a few minutes. The solution was filtered and the residue washed with water and dried; yield of methyl N-benzylidene-α-thiolincosaminide was 46.7 g. having a melting point of 206–107° C.

Analysis.—Calcd. for $C_{16}H_{23}NO_5S$: C, 56.28; H, 6.79; N, 4.10; S, 9.39. Found: C, 56.31; H, 6.61; N, 4.08; S, 9.36.

(B) Ethyl N-benzylidene-α-thiolincosaminide.—By substituting methyl α-thiolincosaminide in Part A by ethyl α-thiolincosaminide, there is obtained ethyl N-benzylidene-α-thiolincosaminide.

(C) By substituting the following aromatic aldehydes in Part A for benzaldehyde, there are obtained the corresponding methyl N-arylmethylene-α-thiolincosaminides: furfural, salicylaldehyde, o-tolualdehyde, o-chlorobenzaldehyde, m-bromobenzaldehyde, p-methoxybenzaldehyde, o-methoxybenzaldehyde, p-hydroxybenzaldehyde, piperonal, p-chlorobenzaldehyde, m-nitrobenzaldehyde, β-naphthaldehyde, o-bromobenzaldehyde, vanillin, terephthaldehyde, cinnamaldehyde, 5-methylfurfural, m-tolualdehyde, p-tolualdehyde, m-chlorobenzaldehyde, p-bromobenzaldehyde, m-methoxybenzaldehyde, 3,4-dimethoxybenzaldehyde (veratric aldehyde), 3,4,5-trimethoxybenzaldehyde, o-nitrobenzaldehyde, phthaldehyde, p-nitrobenzaldehyde, p-bromobenzaldehyde, 2,4-dichlorobenzaldehyde, protocatechualdehyde.

(D) By substituting the following aromatic aldehydes in Part B for benzaldehyde, there are obtained the corresponding ethyl N-arylmethylene-α-thiolincosaminides: furfural, salicylaldehyde, o-tolualdehyde, o-chlorobenzaldehyde, m-bromobenzaldehyde, p-methoxybenzaldehyde, o-methoxybenzaldehyde, p-hydroxybenzaldehyde, piperonal, p-chlorobenzaldehyde, m-nitrobenzaldehyde, β-naphthaldehyde, o-bromobenzaldehyde, vanillin, terephthaldehyde, cinnamaldehyde, 5-methylfurfural, m-tolualdehyde, p-tolualdehyde, m-chlorobenzaldehyde, p-bromobenzaldehyde, m-methoxybenzaldehyde, 3,4-dimethoxybenzaldehyde (veratric aldehyde), 3,4,5-trimethoxybenzaldehyde, o-nitrobenzaldehyde, phthaldehyde, p-nitrobenzaldehyde, p-bromobenzaldehyde, 2,4-dichlorobenzaldehyde, protocatechualdehyde.

EXAMPLE 2

Methyl N-arylmethyl-α-thiolincosaminide (III) and ethyl N-arylmethyl-α-thiolincosaminide (III)

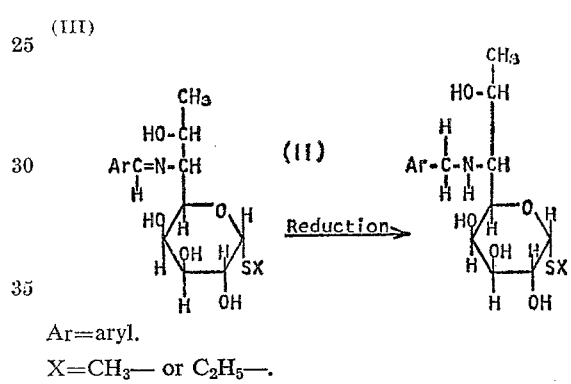

(A) Methyl N-benzyl-α-thiolincosaminide.—A solution of 46.7 g. of methyl N-benzylidene-α-thiolincosaminide (II), as prepared in Example 1, Part A, in 800 ml. of methanol containing 8 g. of platinum oxide moistened with 100 ml. of ethanol, was shaken under 20 pounds per square inch of hydrogen pressure for 4.5 hours. The catalyst was removed by filtration and the solvent distilled under vacuum. The crystalline residue was dissolved in 100 ml. of warm methanol and diluted with 400 ml. of ethyl acetate. The crystals of methyl N-benzyl-α-thiolincosaminide which formed were collected by filtration and dried; yield, 30.7 g. melting at 155–157° C.

Analysis.—Calcd. for $C_{16}H_{25}NO_5S$: C, 55.95; H, 7.34; N, 4.08; S, 9.34. Found: C, 55.01; H, 7.11; N, 4.47; S, 9.55.

(B) Ethyl N-benzyl-α-thiolincosaminide.—By substituting methyl N-benzylidene-α-thiolincosaminide in Part A by ethyl N-benzylidene-α-thiolincosaminide, as prepared in Example 1, Part B, there is obtained ethyl N-benzyl-α-thiolincosaminide.

(C) By substituting methyl N-benzylidene-α-thiolincosaminide in Part A by the methyl N-arylmethylene-α-thiolincosaminides obtained in Example 1, Part C, there are obtained the corresponding methyl N-arylmethyl-α-thiolincosaminides.

(D) By substituting the ethyl N-benzylidene-α-thiolincosaminide in Part B by the ethyl N-arylmethylene-α-thiolincosaminides, as prepared in Example 1, Part D, there are obtained the corresponding ethyl N-arylmethyl-α-thiolincosaminides.

EXAMPLE 3

Oxazolidine compounds

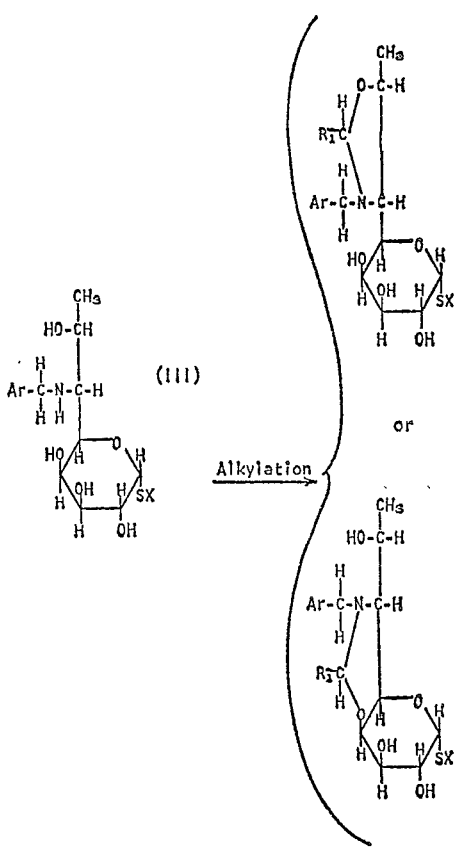

Ar=Aryl.
$R_1$=Hydrogen or lower alkyl of from 1 to 3 carbon atoms, inclusive.
X=$CH_3$— or $C_2H_5$—.

(A) From methyl N-benzyl-α-thiolincosaminide and formaldehyde.—A solution of 11.6 g. of methyl N-benzyl-α-thiolincosaminide (III), as prepared in Example 2, Part A, and 4 ml. of Formalin in 200 ml. of methanol was maintained at 26° C. for 30 minutes. Evaporation of the solvent gave a residue of 11.8 g. which was chromatographed over 1.2 kilograms of silica gel using chloroform-methanol (4:1) for elution. A fraction of 11.8 g. of oil was recovered. A portion of this oil was dissolved in acetone, clarified and evaporated to yield the oxazolidine compound as a glassy solid having an optical rotation $[\alpha]_D^{25} = +175°$ (in methanol).

Analysis.—Calcd. for $C_{17}H_{25}NO_5S$: C, 57.44; H, 7.09; N, 3.94. Found: C, 57.33; H, 6.92; N, 3.43.

(B) By substituting methyl N-benzyl-α-thiolincosaminide in Part A by ethyl N-benzyl-α-thiolincosaminide, as prepared in Example 2, Part B, there is obtained the corresponding oxazolidine compound.

(C) By substituting methyl N-benzyl-α-thiolincosaminide in Part A by the methyl N-arylmethyl-α-thiolincosaminides obtained in Example 2, Part C, there are obtained the corresponding oxazolidine compounds.

(D) By substituting the ethyl N-benzyl-α-thiolincosaminide in Part B by the ethyl N-arylmethyl-α-thiolincosaminides obtained in Example 2, Part D, there are obtained the corresponding oxazolidine compounds.

(E) By substituting the Formalin in Part A by acetaldehyde, propionaldehyde, and butyraldehyde, there are obtained the corresponding oxazolidine compounds.

(F) By substituting the Formalin in Part B by acetaldehyde, propionaldehyde, and butyraldehyde, there are obtained the corresponding oxazolidine compounds.

(G) By substituting the Formalin in Part C by acetaldehyde, propionaldehyde, and butyraldehyde, there are obtained the corresponding oxazoline compounds.

(H) By substituting the Formalin in Part D by acetaldehyde, propionaldehyde, and butyraldehyde, there are obtained the corresponding oxazolidine compounds.

EXAMPLE 4

Methyl N-loweralkyl-α-thiolincosaminide (V), ethyl N-loweralkyl-α-thiolincosaminide (V), methyl N,N-diloweralkyl-α-thiolincosaminide (VI), and ethyl N,N-diloweralkyl-α-thiolincosaminide (VI)

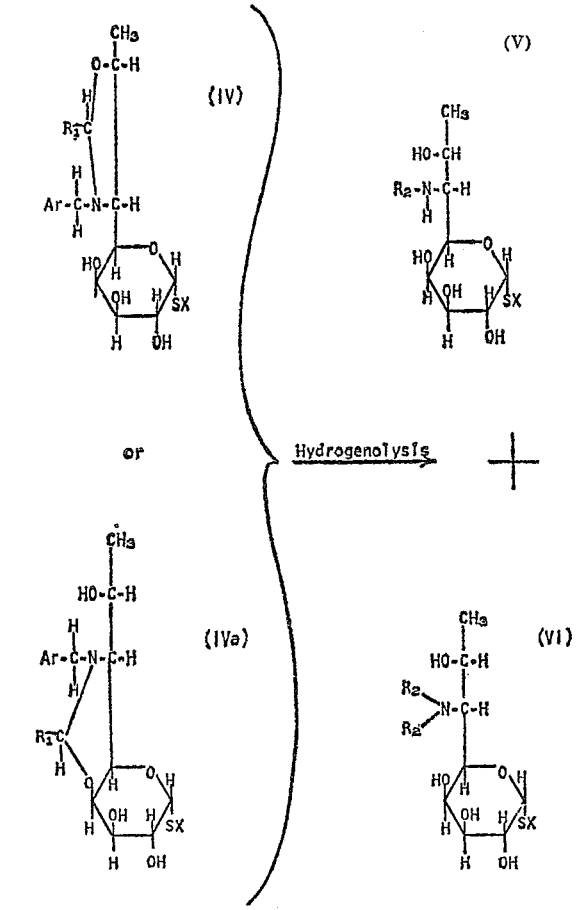

Ar=aryl.
$R_1$=hydrogen or lower alkyl of from 1 to 3 carbon atoms, inclusive.
$R_2$=lower alkyl of from 1 to 4 carbon atoms, inclusive.
X=$CH_2$— or $C_2H_5$—.

(A) Methyl N-methyl-α-thiolincosaminide and methyl N,N-dimethyl-α-thiolincosaminide.—A solution of 6 g. of the oxazolidine compound, as prepared in Example 3, Part A, in 160 ml. of methanol was acidified, to give a red color with moistened pH paper, with 6 N hydrochloric acid. Six grams of 10% palladium on carbon catalyst, moistened with 40 ml. of 95% ethanol, was added to the acidified solution. The resulting mixture was shaken for 5 hours under 35 lbs. per square inch of hydrogen pressure. A few drops of 6 N hydrochloric acid were added to maintain the acidity of the solution and hydrogenation was continued for 12 hours. The catalyst was removed by filtration and the solvent distilled in vacuo after making the mixture basic with triethylamine. The residue, 7.1 grams, was chromatographed over 700 g. of silica gel. Elution with methanol afforded 1.2 g. of methyl N,N-dimethyl-α-thiolincosaminide, which was recrystallized from methanol to give 700 mg. of crystals having a melting point of 174–176° C. A portion of these crystals was recrystallized from methanol to yield crystals having a melting point of 173–175° C. NMR analysis indicated the crystals to be almost pure methyl N,N-dimethyl-α-thiolincosaminide with a trace of methyl N-methyl-α-thiolincosaminide.

The more polar fraction from the silica gel column was recrystallized from methanol to yield 900 mg. of methyl N-methyl-α-thiolincosaminide having a melting point of 187–189° C. Stripping of the column with methanol-5% ammonium hydroxide, followed by recrystallization gave an additional 330 mg. of methyl N-methyl-α-thiolincosaminide having a melting point of 186–188° C. A portion of these crystals was recrystallized from methanol to yield a preparation melting at 180–182° C. and having an optical rotation $[\alpha]_D^{25}=+267°$ in water. The analysis for methyl N-methyl-α-thiolincosaminide is as follows:

*Analysis.*—Calcd. for $C_{10}H_{21}NO_5S$: C, 44.92; H, 7.92; N, 5.24; S. 12.00. Found: C, 45.20; H, 7.54; N, 5.34; S, 11.62.

(B) Ethyl N-methyl-α-thiolincosaminide and ethyl N,N-dimethyl-α-thiolincosaminide.—By substituting the oxazolidine compound in Part A by the oxazolidine compound as prepared in Example 3, Part B, there are obtained ethyl-α-thiolincosaminide and ethyl N,N-dimethyl-α-thiolincosaminide.

(C) By substituting the oxazolidine compounds as prepared in Example A by the oxazolidine compounds as prepared in Example 3, Part C, there are obtained methyl N-methyl-α-thiolincosaminide and methyl N,N-dimethyl-α-thiolincosaminide.

(D) By substituting the oxazolidine compound in Part B by the oxazolidine compounds as prepared in Example 3, Part D, there are obtained ethyl N-methyl-α-thiolincosaminide and ethyl N,N-dimethyl-α-thiolincosaminide.

(E) By substituting the oxazolidine compound in Part A by the oxazolidine compounds obtained in Example 3, Part E, there are obtained the corresponding methyl N-loweralkyl-α-thiolincosaminides and methyl N,N-diloweralkyl-α-thiolincosaminides.

(F) By substituting the oxazolidine compounds in Part B by the oxazolidine compounds obtained in Example 3, Part F, there are obtained the corresponding ethyl N-loweralkyl-α-thiolincosaminides and ethyl N,N-diloweralkyl-α-thiolincosaminides.

(G) By substituting the oxazolidine compounds in Part C by the oxazolidine compounds obtained in Example 3, Part G, there are obtained the corrsponding methyl N-loweralkyl-α-thiolincosaminides and methyl N,N-diloweralkyl-α-thiolincosaminides.

(H) By substituting the oxazolidine compounds in Part D by the oxazolidine compounds obtained in Example 3, Part H, there are obtained the corresponding ethyl N-loweralkyl-α-thiolincosaminides and ethyl N,N-diloweralkyl-α-thiolincosaminides.

EXAMPLE 5

Methyl N,N-diloweralkyl-α-thiolincosaminide (VI)

(A) Methyl N,N-dimethyl-α-thiolincosaminide.—Two hundred mg. of the oxazolidine compound (IV) or (IVa), as prepared in Example 3, Part A, is hydrogenolyzed over 100 mg. of 10% palladium on charcoal for 17 hours under 40 lbs. of hydrogen pressure. The catalyst is removed by filtration and the solvent distilled in vacuo to give a crystalline residue of methyl N,N-dimethyl-α thiolincosaminide which is then recrystallized from methanol to yield methyl N.N-dimethyl-α-thiolincosaminide melting at 170–173° C.

The elemental analysis for methyl N,N-α-dimethyl-α thiolincosaminide is as follows:

*Analysis.*— Calcd. for $C_{11}H_{23}NO_5S$: C, 46.95; H, 8.24; N, 4.98.

(B) By substituting the oxazolidine compound in Part A by the oxazolidine compound as prepared in Example 3, Part B, there is obtained ethyl N,N-dimethyl-α-thiolincosaminide.

(C) By substituting the oxazolidine compound in Part A by the oxazolidine compound as prepared in Example 3, Part C, there is obtained methyl N,N-dimethyl-α-thiolincosaminide.

(D) By substituting the oxazolidine compound in Part B of the oxazolidine compound as prepared in Example 3, Part D, there is obtained ethyl N,N-dimethyl-α-thiolincosaminide.

(E) By substituting the oxazolidine compound in Part C by the oxazolidine compound as prepared in Example 3, Part E, there is obtained the corresponding methyl N,N-diloweralkyl-α-thiolincosaminide.

(F) By substituting the oxazolidine compound in Part D by the oxazolidine compound as prepared in Example 3, Part F, there is obtained the corresponding ethyl N,N-diloweralkyl-α-thiolincosaminide.

EXAMPLE 6

(A) Methyl N-methyl-α-thiolincosaminide pentaacetate.—A solution of 500 mg. of methyl N-methyl-α-thiolincosaminide, as prepared in Example 4, Part A, in 2 ml. of pyridine and 2 ml. of acetic anhydride, is kept at ambient temperature for 17 hours. Two ml. of water is added, and after 10 min. an additional 15 ml. of water is added. Methyl N-methyl-α-thiolincosaminide pentaacetate is recovered by extraction with methylene chloride. After drying the product and evaporating the solvent, a residue of methyl N-methyl-α-thiolincosaminide pentaacetate is obtained.

(B) Methyl N,N-dimethyl-α-thiolincosaminide tetraacetate.—By substituting the methyl N-methyl-α-thiolincosaminide in Part A by methyl N,N-dimethyl-α-thiolincosaminide, as prepared in Example 5, Part A, there is obtained methyl N,N-dimethyl-α-thiolincosaminide tetraacetate.

(C) By substituting the methyl N-methyl-α-thiolincosaminide in Part A by ethyl N-methyl-α-thiolincosaminide, as prepared in Example 4, Part B, there is obtained ethyl N-methyl-α-thiolincosaminide pentaacetate.

(D) By substituting the methyl N,N-dimethyl-α-thiolincosaminide in Part B by ethyl N,N-dimethyl-α-thiolincosaminide, as prepared in Example 4, Part B, there is obtained ethyl N,N-dimethyl-α-thiolincosaminide tetraacetate.

(E) By substituting the acetic anhydride in Parts A, B, C, and D by propionyl chloride, isobutryl chloride, valeryl chloride, isovaleryl chloride, neopentylacetyl chloride, hexanoyl chloride, heptanoyl chloride, phenylacetyl chloride, toluoyl chloride, cyclopentanepropionyl chloride, 1-cylopentene-1-propionyl chloride, cyclohexaneoctyl chloride, acrylyl chloride, crotonyl chloride, 2-hexynoyl robenzyl chloride, anisoyl chloride, salicyloyl bromide, p-nitrobenzoyl chloride, cyanoacetyl chloride, caprylyl chloride, palmitoyl chloride, and stearyl chloride, there are obtained the corresponding tetraacylates and pentaacylates.

I claim:
1. A compound of the formula:

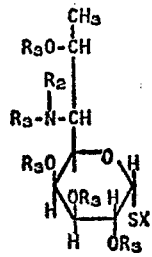

and the salts thereof, wherein $R_2$ is lower alkyl of from 1 to 4 carbon atoms, inclusive; $R_3$ is hydrogen or an acyl, said acyl advantageously being the acyl of a hydrocarbon carboxylic acid containing not more than 18 carbon atoms; or a halo-, nitro-, hydroxy-, amino-, cyano-, and thiocyano-substituted hydrocarbon carboxylic acid acyl radical of not more than 18 carbon atoms; and X is $CH_3$— or $C_2H_5$—.

2. A compound according to claim 1, and salts thereof, wherein $R_2$ and X are methyl, and $R_3$ is hydrogen.

3. A compound according to claim 1, and salts thereof, wherein $R_2$ is methyl, X is ethyl, and $R_3$ is hydrogen.

4. A compound of the formula:

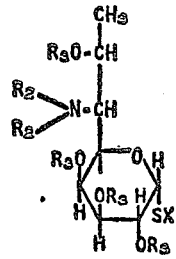

and the salts thereof, wherein $R_2$ is lower alkyl of from 1 to 4 carbon atoms, inclusive; $R_3$ is as defined in claim 1; and X is $CH_3$— or $C_2H_5$—.

5. A compound according to claim 4, and salts thereof, wherein $R_2$ and X are methyl, and $R_3$ is hydrogen.

6. A compound according to claim 4, and salts thereof, wherein $R_2$ is methyl, X is ethyl, and $R_3$ is hydrogen.

7. A compound of the formula:

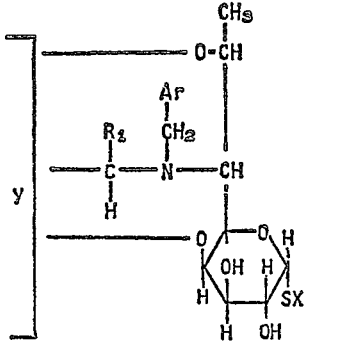

(VII)

and the salts thereof, wherein Ar is an aryl radical of an aromatic aldehyde of the furan, benzene and naphthalene series; $R_1$ is hydrogen or lower alkyl of from 1 to 3 carbon atoms, inclusive; X is $CH_3$— or $C_2H_5$—; y is hydrogen attached to an oxygen, and the remaining free bonds are connected.

8. A compound according to claim 7, and salts thereof, wherein $R_1$ is hydrogen or lower alkyl of from 1 to 3 carbon atoms, inclusive; Ar is phenyl, and X is $CH_3$— or $C_2H_5$—.

9. A compound according to claim 7 wherein $R_1$ is hydrogen; Ar is phenyl; and X is $CH_3$— or $C_2H_5$—.

10. A compound according to claim 7 wherein $R_1$ is hydrogen; Ar is an aryl radical of an aromatic aldehyde of the furan, benzene and naphthalene series; and X is $CH_3$— or $C_2H_5$—.

11. A compound according to claim 7 wherein $R_1$ is hydrogen; Ar is phenyl; and X is $CH_3$—.

12. A compound of the formula:

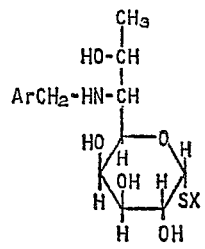

(III)

and the salts thereof, wherein Ar is an aryl radical of an aromatic aldehyde of the furan, benzene and naphthalene series; and X is $CH_3$— or $C_2H_5$—.

13. A compound according to claim 12, and salts thereof, wherein Ar is phenyl and X is $CH_3$—.

14. A compound of the formula:

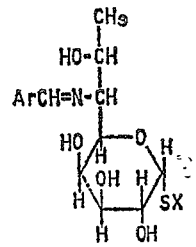

(II)

and the salts thereof, wherein Ar is an aryl radical of an aromatic aldehyde of the furan, benzene and naphthalene series; and X is $CH_3$— or $C_2H_5$—.

15. A compound according to claim 14, and salts thereof, wherein Ar is phenyl; and X is methyl.

16. A process for producing a compound of the formula:

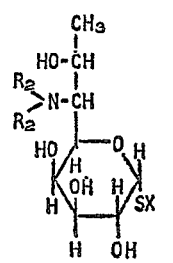

(VI)

wherein both $R_2$'s are lower alkyl of from 1 to 4 carbon atoms, inclusive; or wherein one $R_2$ is hydrogen and the other $R_2$ is lower alkyl of from 1 to 4 carbon atoms, inclusive; and wherein X is $CH_3$—, which comprises (a) condensing methyl α-thiolincosaminide with an aromatic aldehyde of the furan, benzene and naphthalene series to form methyl N-arylmethylene-α-thiolincosaminide; (b) reducing methyl N-arylmethylene-α-thiolincosaminide using a platinum catalyst to give methyl N-arylmethyl-α-thiolincosaminide; (c) treating methyl N-arylmethyl-α-thiolincosaminide with a lower aliphatic aldehyde to give the corresponding oxazolidine compound; and (d) hydrogenating the oxazolidine compound to give methyl N,N-diloweralkyl-α-thiolincosaminide and methyl N-loweralkyl-α-thiolincosaminide.

17. A process for producing a compound of the formula:

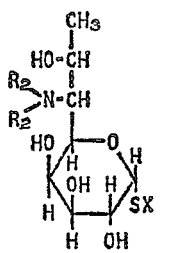

(VI)

wherein both $R_2$'s are lower alkyl of from 1 to 4 carbon atoms, inclusive; or wherein one $R_2$ is hydrogen and the other $R_2$ is lower alkyl of from 1 to 4 carbon atoms, inclusive; and wherein X is $C_2H_5$—, which comprises (a) condensing ethyl α-thiolincosaminide with an aromatic aldehyde of the furan, benzene and naphthalene series to form ethyl N-arylmethylene-α-thiolincosaminide; (b) reducing ethyl N-arylmethylene-α-thiolincosaminide using a platinum catalyst to give ethyl N-arylmethyl-α-thiolincosaminide; (c) treating ethyl N-arylmethyl-α-thiolincosaminide with a lower aliphatic aldehyde to give the corresponding oxazolidine compound; and (d) hydrogenating the oxazolidine compound to give N,N-diloweralkyl-α-thiolincosaminide and ethyl N-loweralkyl-α-thiolincosaminide.

References Cited

UNITED STATES PATENTS

| | | | |
|---|---|---|---|
| 3,255,176 | 6/1966 | Bannister | 260—210 |
| 3,366,624 | 1/1968 | Argoudelis et al. | 260—210 |

OTHER REFERENCES

Migrdichean Organic Synthesis vol. I, 1957, pp. 465–468, Reinhold Publishing Corp., New York, N.Y.

LEWIS GOTTS, Primary Examiner

J. R. BROWN, Assistant Examiner

U.S. Cl. X.R.

260—77, 999

FO-1050
(5/69)

UNITED STATES PATENT OFFICE
CERTIFICATE OF CORRECTION

Patent No. 3,459,734                        Dated August 5, 1969

Inventor(s) Barney J. Magerlein

It is certified that error appears in the above-identified patent and that said Letters Patent are hereby corrected as shown below:

Column 2, line 74, for "ET" read -- ETL --; column 4, line 22, for "N-acrylmethyl1MTL" read -- N-arylmethyl-MTL --; column 5, line 39, for "methylcyclohexaneactic" read -- methylcyclohexaneacetic --; column 5, lines 45-46, for "phenylpropionic" read -- phenylpropiolic --; column 6, line 50, for "mothproofing in accordance" read -- mothproofing agents in accordance --; column 10, line 3, for "oxazoline" read -- oxazolidine --; column 10, line 54, for "X = CH$_2$-" read -- X = CH$_3$- --; column 11, line 24, for "ethyl-α-thiolincosaminide" read -- ethyl N-methyl-α-thiolincosaminide --; column 11, line 66, for "N.N-dimethyl-" read -- N,N-dimethyl- --; column 12, line 50, for "1-cylopentene" read -- 1-cyclopentene--; column 12, line 51, for "cyclohexaneoctyl" read -- cyclohexaneacetyl --; column 12, lines 52-, for "robenzyl chloride, anisoyl chloride," read -- chloride, 2-octynoyl chloride, chloroacetyl bromide, p-chlorobenzoyl chloride, anisoyl chloride --; column 15, line 4, for "give N,N-" read -- give ethyl N,N- --.

SIGNED AND
SEALED

AUG 4 - 1970

(SEAL)
Attest:

Edward M. Fletcher, Jr.
Attesting Officer

WILLIAM E. SCHUYLER, J
Commissioner of Patent